No. 833,828. PATENTED OCT. 23, 1906.
A. ELLIS.
SPRING WHEEL.
APPLICATION FILED DEC. 26, 1905.
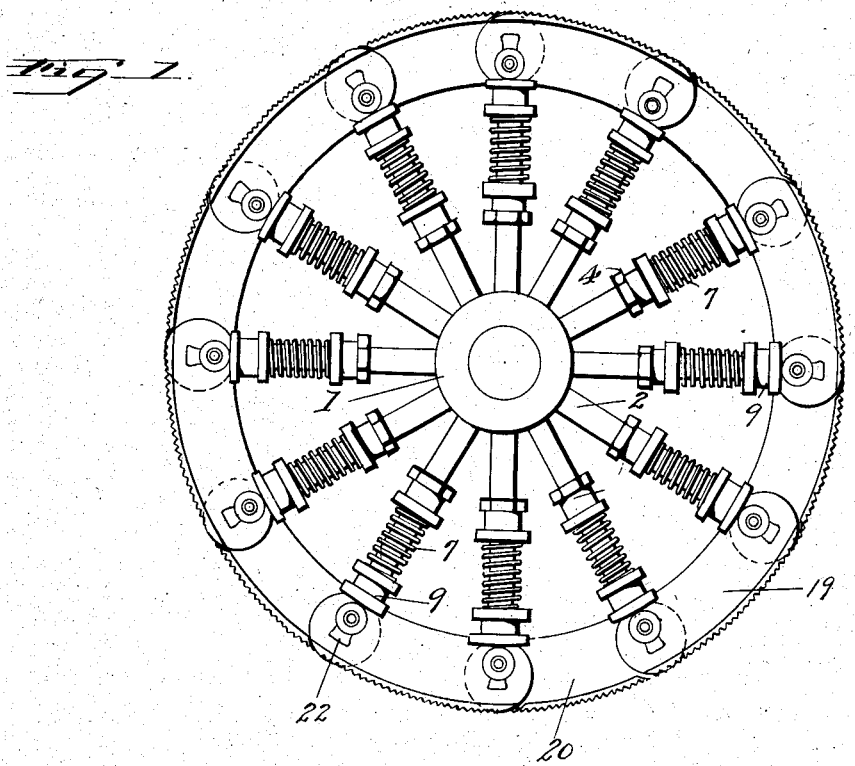
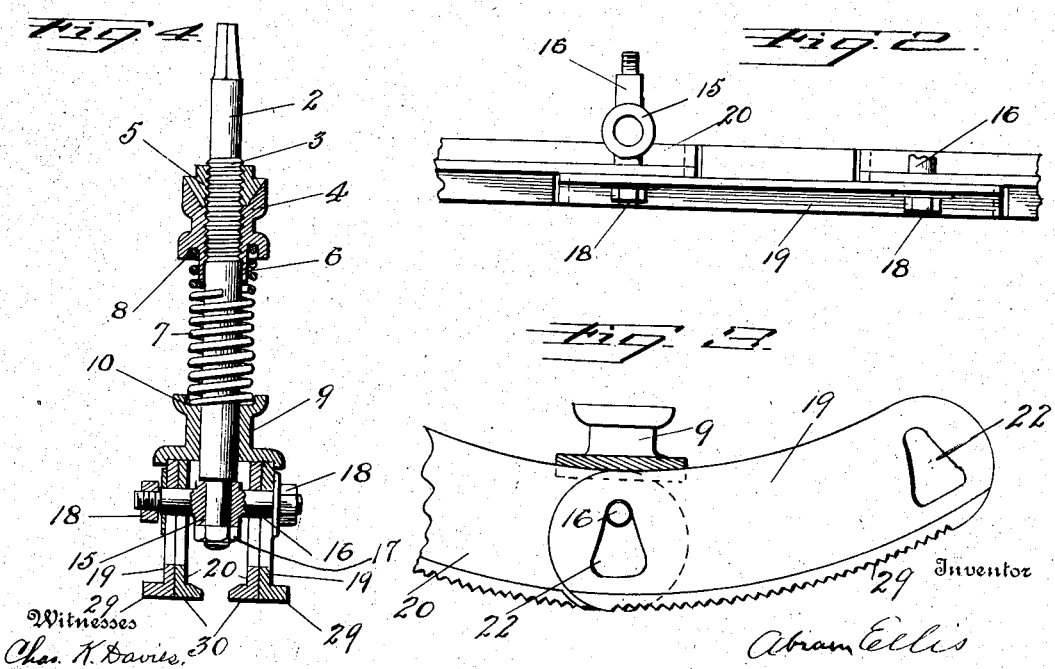
Witnesses
Chas. K. Davies.
W. L. Shipley.
Inventor
Abram Ellis
W. A. Bartlett
His Attorney
By

UNITED STATES PATENT OFFICE.

ABRAM ELLIS, OF AUGUSTA, GEORGIA.

SPRING-WHEEL.

No. 833,828.  Specification of Letters Patent.  Patented Oct. 23, 1906.

Application filed December 26, 1905. Serial No. 293,254.

*To all whom it may concern:*

Be it known that I, ABRAM ELLIS, a citizen of the United States, residing at Augusta, in the county of Richmond and State of Georgia, have invented certain new and useful Improvements in Spring-Wheels for Vehicles, of which the following is a specification, reference being had therein to the accompanying drawings.

This invention relates to spring-wheels for vehicles.

The object of the invention is to produce a wheel with a yielding rim composed of segments, the segments being supported by coiled springs, which are compressed as the wheel passes over an obstacle, so that the whole load need not be lifted to pass over slight obstructions.

Figure 1 is an elevation of a wheel according to this invention. Fig. 2 is a broken plan of one of the rim-supports with rim-segments attached at one side thereof, showing part of another support and connected segments. Fig. 3 is a side elevation of one rim-segment and part of another and a collar, partly in section. Fig. 4 is an elevation of one of the spokes and springs and the parts connected to the spoke.

The numeral 1 indicates the hub of a wheel. This hub has any suitable number of spokes 2 2, said spokes being rigidly connected to the hub in any convenient manner. The spokes are preferably enlarged and externally screw-threaded for a part of their length, as at 3, Fig. 4. A nut 4 may be screwed along this threaded portion of the spoke, and a lock-nut 5 holds the nut 4 in place. The nut 4 has a sleeve or elongation 6, extending from its outer end to prevent the spring 7 from coming in contact with the threaded portion of the spoke. Nut 4 has a seat 8 for the end of the coiled spring 7, which spring surrounds the spoke 2. Outside of the spring 7 toward the wheel-rim there is a collar 9 surrounding the spoke and free to slide on said spoke. The end of this collar which is toward the hub has a seat 10 for the outer end of spring 7.

The outer end of spoke 2 is of reduced diameter, affording a seat for the segment-carrier. This carrier consists of a ring or band 15, which surrounds the spoke, and has trunnions 16, one at each side of the band and projecting in a line parallel with the axis of the hub 1. The band 15 is held to the spoke by a nut 17, which screws on a threaded end of the spoke, or it may be held in other suitable manner.

The wheel-rim is composed of a number of segments 19 and 20, each series of segments constituting a ring or broken annulus. Each rim-segment 19 or 20 is composed of a curved plate of metal constituting a part of the rim. Near each end of each segment there is a slot 22 of nearly triangular form. The segments are so applied to the wheel that the trunnions or transverse pins 16 extend through said slots 22, and nuts 18 on the ends of the trunnions 16 hold the segments 19 and 20 on the trunnions 16. The edges of the segments 19 and 20 then rest against the outer faces of the collars 9.

The segments 19 and 20 have tread-flanges 29 and 30, which project outwardly or inwardly, according to the position of the segments. These tread-flanges are preferably corrugated crosswise to the wheel.

When the segments 19 and 20 are assembled on the trunnions 16 of the rim-supports, the collars 9 should press the inner edge or end of slots 22 against said trunnions, the collars 9 being pressed toward the outer ends of the spokes by springs 7.

The rim-segments being assembled in the manner described, constitute the wheel-rim. When a wheel so constructed passes over an obstacle, the segments which engage said obstacle will yield, forcing up the collar 9, which is nearest the obstacle. The segments may yield by compressing either one spring, as when the adjacent ends of two segments are lifted, or two springs, as when the obstacle is larger than half the length of a segment; but in either case the form of slots 22 permits the yielding of one or more segments without altering the form of the wheel beyond the extremities of such segments as encounter the obstacle. On passing the obstacle the segments will be pressed back to normal position by the springs 7 acting on collars 9.

By adjusting nuts 4 the tension of the springs 7 may be regulated, so that the rim-segments will yield under a greater or less load.

The flanges constituting the tread of the wheel may be made wider or narrower, according to the circumstances of the case. The yield of the segments is limited by the width of the slots 22.

I have not attempted to show the proportions of any of the parts, as these will depend on the necessities of the case. I have merely explained the general features of construction and operation herein.

What I claim is—

1. The combination, in a spring-wheel for vehicles, of a hub, rigid radiating spokes, springs connected to the spokes and adjustable as to tension, and a rim composed of loosely-connected segments of a ring, yieldingly connected to the spokes, and having their supports from the springs, substantially as described.

2. The combination, in a spring-wheel, of a hub, radiating spokes having external screw-threads, a nut on each spoke engaging said thread, a coiled spring around the spoke and having its bearing on the nut, and a rim-segment extending between adjacent spokes and loosely connected thereto, and having its support from the springs on said spokes.

3. The combination of the hub, radiating spokes rigidly connected to the hub, coiled springs on said spokes having bearings toward the hub, segment-carriers outside said springs, and rim-segments yieldingly connected to said segment-carriers and to each other, and supported by said springs.

4. The combination in a spring-wheel, of the hub, radiating spokes rigidly connected to the hub, springs surrounding said spokes, sliding collars surrounding the spokes and supported by the springs, and a rim composed of segments loosely connected together, and bearing on said collars.

5. The combination, in a spring-wheel, of the hub, radiating spokes, springs carried by said spokes, and a ring at the outer, and a second ring at the inner side of said spokes, each ring composed of segments loosely connected, said rings supported by the springs, substantially as described.

6. The combination, in a spring-wheel, of a hub and radiating spokes, springs carried by the spokes, and a rim composed of segments connected by transverse pins extending through flaring slots in the segments, said segments supported by the springs, substantially as described.

7. The combination, in a spring-wheel, of a hub and radiating spokes having external screw-threads, nuts on said spokes having sleeves extending outside the screw-threads, springs having bearings on said nuts outside the said sleeves, and segmental rims supported by said springs.

In testimony whereof I affix my signature in presence of two witnesses.

ABRAM ELLIS.

Witnesses:
W. A. BARTLETT,
M. E. BROWN.